United States Patent [19]

Gotal et al.

[11] Patent Number: 4,517,500
[45] Date of Patent: May 14, 1985

[54] CONTROLLER FOR ELECTROMAGNETIC EXCITER USING POWER LINE SUBHARMONIC

[75] Inventors: John D. Gotal, Bristol, R.I.; Junius D. Scott, Homer City, Pa.

[73] Assignee: FMC Corporation, Chicago, Ill.

[21] Appl. No.: 552,597

[22] Filed: Nov. 16, 1983

[51] Int. Cl.³ .............................................. H02K 33/00
[52] U.S. Cl. ...................................... 318/130; 318/132
[58] Field of Search ......................... 318/114, 128–132

[56] References Cited

U.S. PATENT DOCUMENTS

| | | | |
|---|---|---|---|
| 3,122,690 | 2/1964 | Dion et al. | 318/128 |
| 3,129,366 | 4/1964 | Fry | 318/130 X |
| 3,129,367 | 4/1964 | Der | 318/130 |
| 3,400,316 | 9/1968 | Kuschel | 318/114 |
| 4,215,297 | 7/1980 | Jacquemet | 318/130 |
| 4,303,869 | 12/1981 | Baran | 318/130 |
| 4,401,925 | 8/1983 | Brander | 318/128 X |

*Primary Examiner*—Donovan F. Duggan
*Attorney, Agent, or Firm*—Lloyd B. Guernsey; H. M. Stanley; R. B. Megley

[57] ABSTRACT

A synchronized subharmonic controller for a dual coil electromagnetic vibrator, which derives both power and timing from a single phase AC line, having a trigger circuit which operates the coils at one-third the power line frequency. A timing circuit is optically coupled to alternately fire a pair of oppositely-directed SCR's with each SCR connecting one of the coils across the AC line. The optical coupling reduces feedback from the coil circuitry to the timing circuit. A pair of capacitors supply additional power to operate the coils and to reduce the peak values of current supplied by the power line.

9 Claims, 17 Drawing Figures

FIG_3

FIG_4

FIG_6A  FIG_6B  FIG_6C

FIG_6D  FIG_6E  FIG_6F

FIG_6G  FIG_6H  FIG_6I

FIG_7

FIG_8

4,517,500

CONTROLLER FOR ELECTROMAGNETIC EXCITER USING POWER LINE SUBHARMONIC

BACKGROUND OF THE INVENTION

The present invention relates to vibrators for handling large loads, and more particularly, to vibrator controllers that are synchronized to a subharmonic of an electrical power line frequency.

Vibratory material handling of large loads requires the use of long strokes applied at a low rate or low frequency. These frequencies are significantly lower than those capable of delivery by conventional electromagnetic gap motors. Prior art vibrators include mechanical exciters utilizing eccentric weight(s) secured to a shaft rotated by an electric motor or other prime mover. The bearings rotatably mounting the shaft, and the motor armature when directly coupled to the shaft, are subjected to high loads resulting from the oscillating forces created by the rotation of the eccentric weight(s), which loads adversely affect the service life of the bearings. In addition, the environment in which the vibratory mechanism must operate is often dusty, or otherwise not conductive to long bearing life, resulting in wear of shaft and/or bearings and aggravating the service problems relating to these bearings. Because of the heat generated by the motor, and the fact that its output motion is rotational, shrouding of the motor is difficult and/or very costly. Consequently, the use of such mechanical exciters is generally restricted to environments where exposed electric motors do not represent a hazard.

The electromagnetic vibrators, which do not employ a rotating mass, but instead reciprocate a mass in a straight line motion, have no bearings, obviating the problems associated therwith, and can be completely enclosed or shrouded. However, such vibrators require a controller to supply electric power to an electromagnetic, or preferably dual opposing magnets which are alternately energized. In order to maximize available stroke amplitudes for the reciprocating mass, static forces acting thereon must be eliminated to the extent possible. This can be achieved by both energizing the magnets for an electrical conduction period which is of equal time duration and magnitude for each magnet, and synchronizing the magnets to turn on in exactly opposite phases to each other.

SUMMARY OF THE INVENTION

The present invention provides a controller for operating an electromagnetic exciter at a frequency which is a subharmonic of an electrical power line frequency. The controller supplies electrical current to a pair of electric magnetic coils in the vibratory at a frequency which is exactly one-third of the power line frequency, with each coil eneergized only once per mechanical cycle. The power for driving the coils and the timing for operating the two coils in a 180° phase relationship are both derived from a single phase AC power line. A pair of capacitors provide an initial surge of voltage for energizing the coils and for reducing the amplitude of current pulses supplied by the AC power line to operate the electromagnetic coils. Timing circuitry controls the percentage of time that the coils are energized to control the amplitude of vibration. The amplitude of vibration can also be controlled by controlling the amplitude of voltage or current supplied to the coils.

BRIEF DESCRIPTION OF THE DRAWINGS

FIGS. 5 and 6 (a through i) are voltage waveforms useful in explaining the operation of the digital control circuit of FIGS. 2–4.

DESCRIPTION OF THE PREFERRED EMBODIMENT

Figure 1:
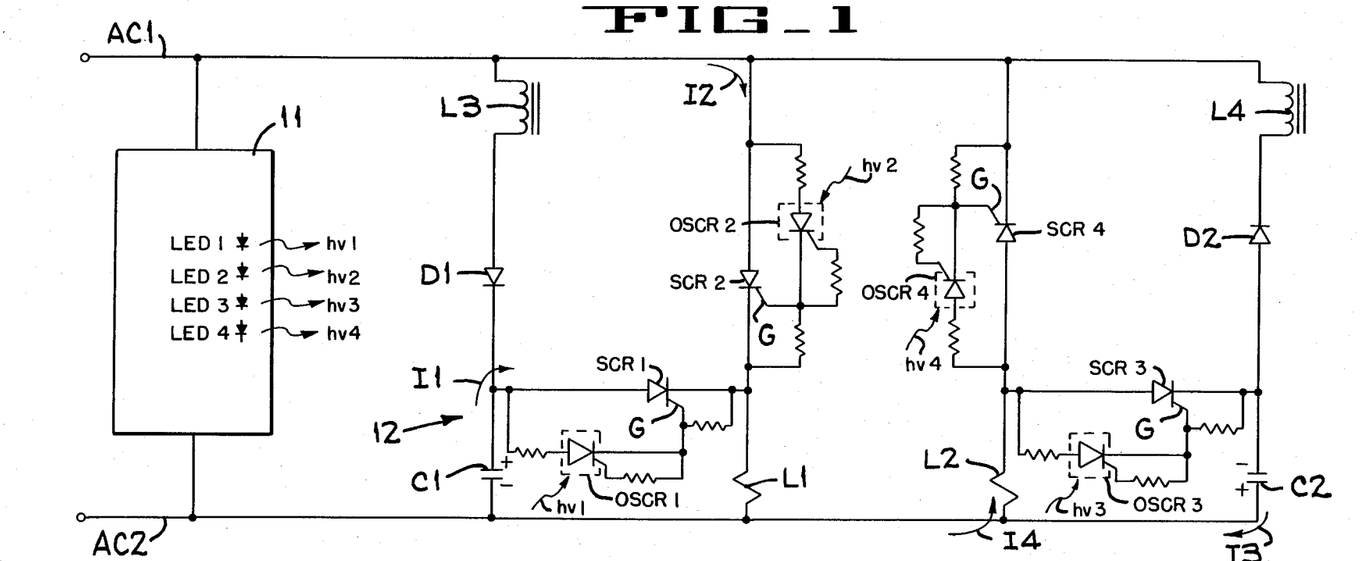
FIG. 1 is a block diagram of a controller according to the present invention.

Referring to FIG. 1, a single phase alternating current power line represented by AC1 and AC2, is connected to a phase control circuit 11 and to an electromagnetic power circuit 12. The phase control circuit 11 generates a plurality of square wave control signals at a frequency of one-third the power line frequency and these signals are used to control current for a pair of electromagnetic coils L1 and L2. The current is supplied at a frequency of one-third the power line frequency with current for coil L1 180° out of phase with the current for coil L2 to drive the coils on alternate halves of the load cycle. A plurality of light emitting diodes LED1–LED4 uses the control signals (FIG. 5) to provide electromagnetic radiation hv1–hv4 (FIG. 1) to operate a plurality of optocoupled silicon controlled rectifiers OSCR1–OSCR4. The rectifiers OSCR1–OSCR4, in turn trigger a plurality of silicon controlled rectifiers SCR1–SCR4 to supply power for driving the electromagnetic coils L1 and L2.

Prior to the initial energizing of coils L1 and L2, a pair of capacitors C1 and C2 have been charged with the electrical potential shown in FIG. 1. At a time t2 (FIGS. 5, 6D) a pulse of current through the light emitting diode LED1 provides electromagnetic energy hv1 which causes the optically coupled silicon controlled rectifier OSCR1 (FIG. 1) to be rendered conductive so the positive potential on the upper plate of capacitor C1 is coupled to a gate G of the silicon controlled rectifier SCR1 rendering SCR1 conductive. A current I1 flows from the upper plate of capacitor C1 through SCR1 and electromagnetic coil L1 to the lower plate of C1 thereby energizing coil L1.

Figure 5:
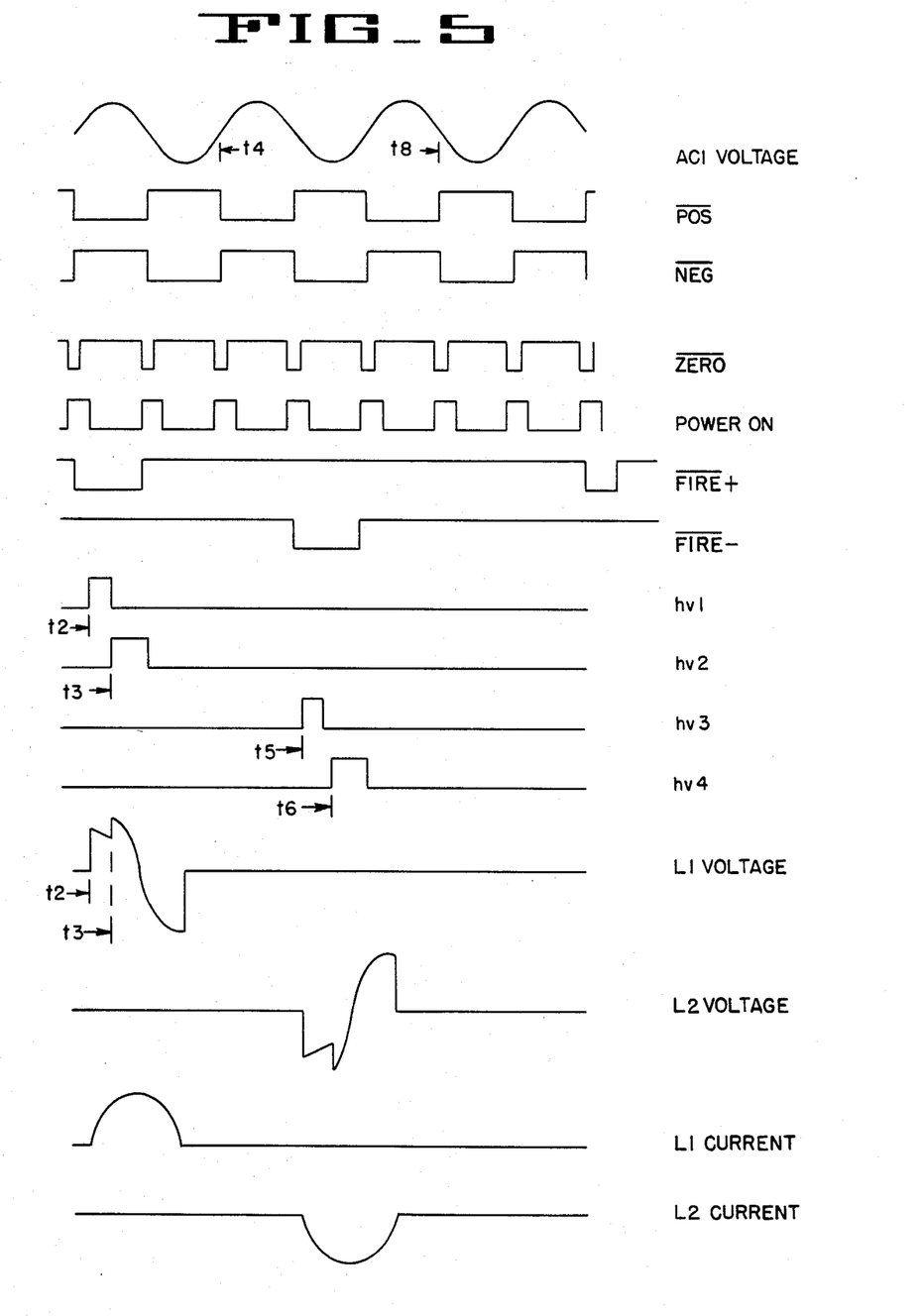
Figure 6A:
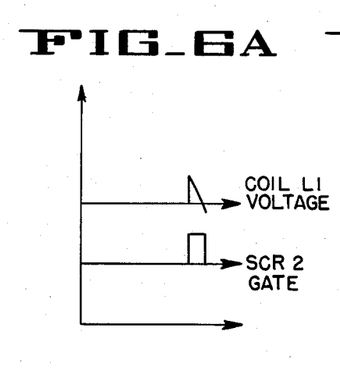
Figure 6B:
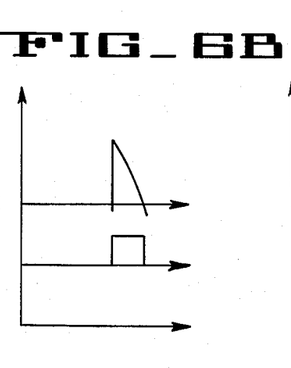
Figure 6C:
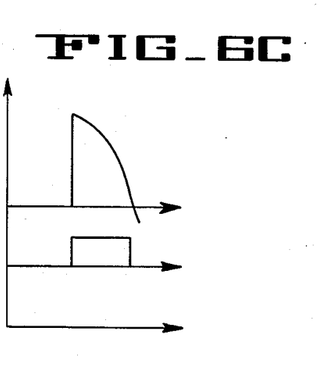
Figure 6D:
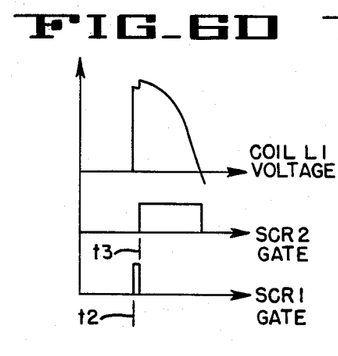

At time t3 (FIGS. 5, 6D) a pulse of current through the light emitting diode LED2 (FIG. 1) provides electromagnetic energy hv2 which causes the optically coupled silicon controlled rectifier OSCR2 to be rendered conductive so that the positive potential on the line AC1 is coupled to a gate G of the silicon controlled rectifier SCR2 rendering SCR2 conductive. A current I2 flows from the terminal AC1 through SCR2 and electromagnetic coil L1 to the power terminal AC2 thereby providing additional energizing current for the coil L1. The waveform of voltage applied to cross coil L1 is a combination of the voltage on capacitor C1 and the voltage on power line AC1 as shown in FIGS. 5, 6D. When the current through the diode LED1 occurs earlier during the positive half of the AC1 voltage cycle the duration of time between the application of the capacitor voltage to the coil L1 and the application of the power line voltage across coil L1 changes, causing the voltage waveform across the coil to change from the shape shown in FIG. 6D to the waveform shown in FIG. 6E and to the waveform shown in 6F.

At time t5 (FIG. 5) a pulse of current through the light emitting diode LED3 provides electromagnetic energy hv3 which causes the optical coupled silicon controlled rectifier OSCR3 (FIG. 1) to be rendered conductive so the positive potential on the lower plate of capacitor C2 is coupled through L2 to the anode of the silicon controlled rectifier SCR3 rendering SCR3 conductive. A current I3 flows from the lower plate of capacitor C2 through the coil L2 and SCR3 to the upper plate of capacitor C2 thereby energizing coil L2. The time t5 can also be changed to occur earlier or later in the negative portion of the AC1 voltage cycle to change the amount of time the voltage across C2 is applied to coil L2.

At time t6 (FIG. 5) a pulse of current through the light emitting diode LED4 provides electromagnetic energy hv4 which causes OSCR4 to be rendered conductive and this in turn renders SCR4 conductive so that the voltage from the power line AC2 is developed across the coil L2. The electroptically coupled pairs LED1/OSCR1-LED4/OSCR4 provide positive coupling of timing signals from the phase control circuit 11 to the power circuit 12 and prevent electrical noise in the power circuit from being coupled into the timing circuit. The total amount of current through coil L2 is substantially equal to the total amount of current through L1.

On each positive half cycle of voltage at power line AC1 (FIG. 1), a current flows downward through an inductor L3 and a diode D1 to provide the charge on capacitor C1. On each negative half cycle of voltage at power line AC1, a current flows upward through a diode D2 and an inductor L4 to provide the charge on capacitor C2.

Figure 2:
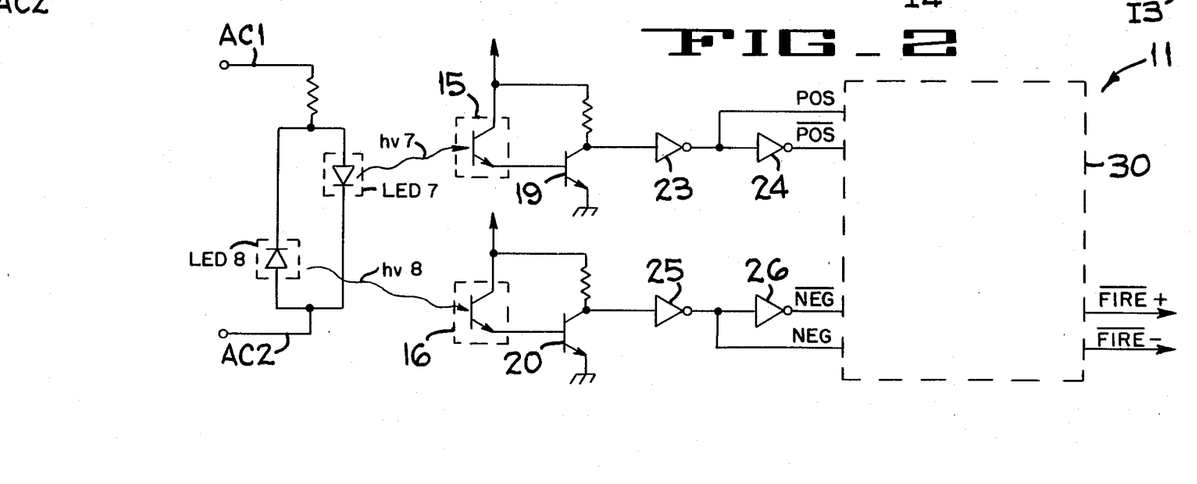
FIGS. 2–4 are schematic diagrams of a digital control circuit illustrating a preferred manner of practicing the invention of FIG. 2.
Figure 3:
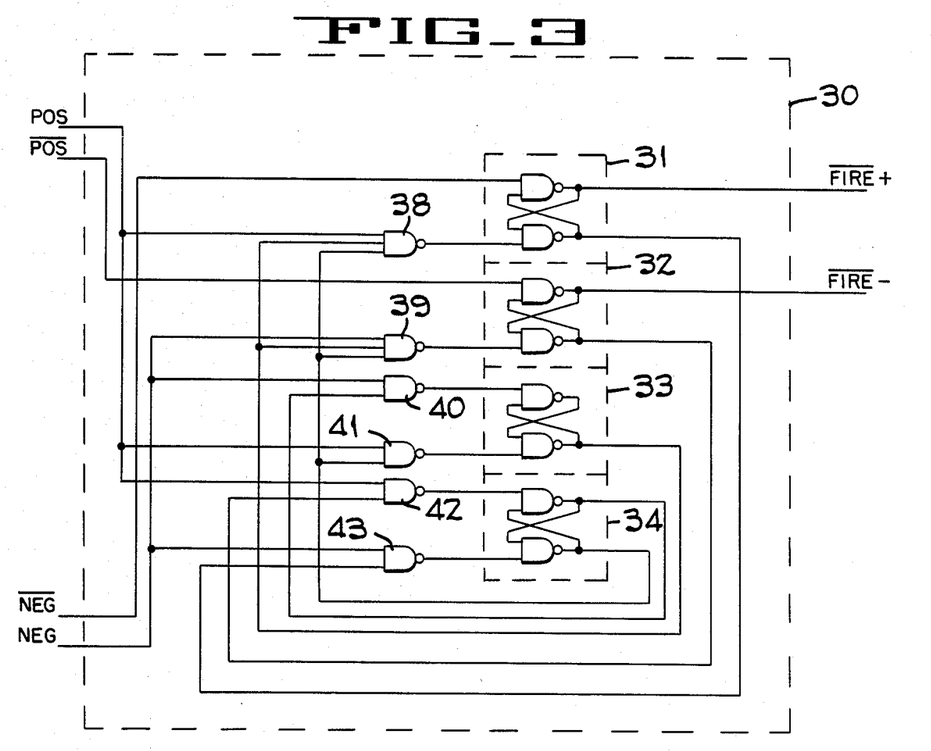
Figure 4:
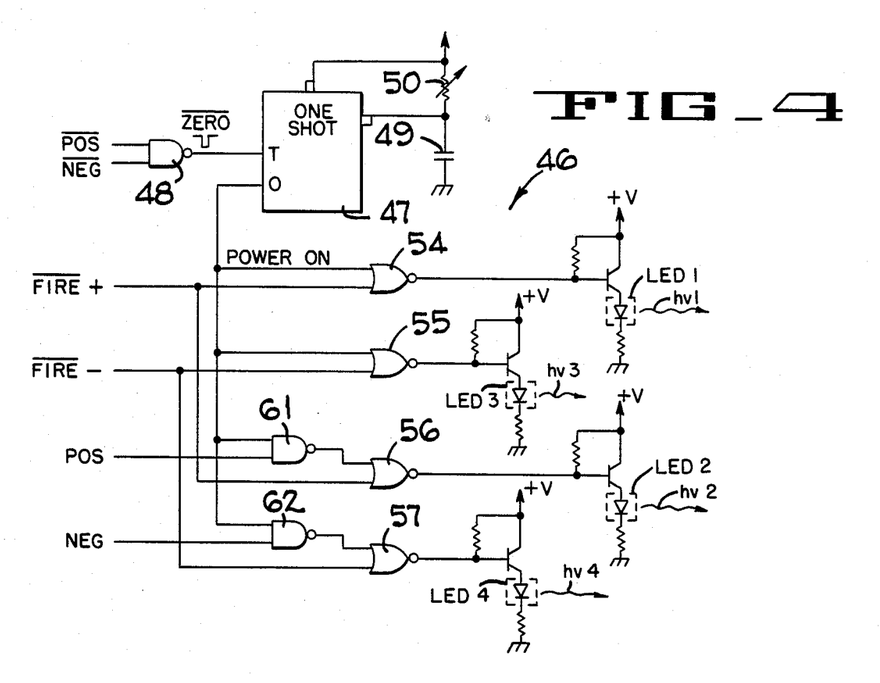

Details of the phase control circuit 11 (FIG. 1) and of the method of developing the control signals (FIG. 5) are disclosed in FIGS. 2-4. A pair of light emitting diodes LED7, LED8 (FIG. 2) develop electromagnetic radiation hv7, hv8 which is directed to a pair of optically activated transistors 15, 16. The diodes LED7, LED8 conduct on opposing half cycles of the AC input and cause the corresponding transistors 15, 16 to develop current pulses which are amplified by a pair of transistors 19, 20 and inverted in phase by a plurality of inverters 23–26. Inverters 23–26 produce the positive and negative timing pulses $\overline{POS}$, $\overline{NEG}$ shown in FIG. 5 along with inverted signals (not shown) which are used by an asynchronous sequential circuit 30 (FIGS. 2, 3) to develop an additional pair of timing signals FIRE+ and FIRE— to insure correct timing of current through the coils L1, L2 (FIG. 1). The asynchronous sequential circuit 30 (FIG. 3) includes a plurality of flip-flops 31–34 and a plurality of NAND-gates 38–43 arranged as a counter to provide both the $\overline{FIRE+}$ and the $\overline{FIRE-}$ negative signals of FIG. 5.

A driver circuit 46 of FIG. 4 uses the signals developed by the counter circuit of FIG. 3 to energize the diodes LED1–LED4 which in turn, energize the rectifiers OSCR1–OSCR4 and SCR1–SCR4 (FIG. 1) in the correct sequence and in a controlled timing relationship. A one-shot multivibrator 47 and its associated RC timing circuit provide the Power On signals disclosed in FIG. 5, and these signals are combined with other signals shown in FIG. 5 to render the diodes LED1–LED4 conductive in the proper phase and desired time duration. The $\overline{POS}$ and $\overline{NEG}$ signals are used by a NAND-gate 48 to provide $\overline{ZERO}$ trigger pulses to one-shot 47 which develops Power On pulses having a timed duration determined by a capacitor 49 and a variable resistor 50. The width (time duration) of these timing pulses can be adjusted by adjusting the value of resistor 50.

The Power On and $\overline{FIRE+}$ signals are combined by a NOR-gate 54 to render diode LED1 (FIG. 4) conductive and apply the voltage of capacitor CL (FIG. 1) to coil L1 as previously described. The duration of time the voltage from C1 is applied to coil L1 is determined by the value of resistor 50 (FIG. 4). Other signals shown in FIG. 5 are similarly combined by a plurality of NOR-gates 55–57 and NAND-gates 61, 62 in a well known manner, to provide the electromagnetic energy pulses hv2–hv4 (FIGS. 1, 5) to provide line voltage to coil L1, and provide voltage from capacitor C2 and line AC1 (FIG. 1) to coil L2. When SCR2 is rendered conductive at time t3 (FIG. 5) the line voltage applied to coil L1 (FIG. 1) is greater than the voltage on capacitor C1 so current through SCR1 is terminated and the power line supplies current to coil L1. The inductance of coil L1 causes current I2 to flow for a duration of time after the voltage at AC1 drops below a zero value as seen in FIG. 5.

Figure 6E:
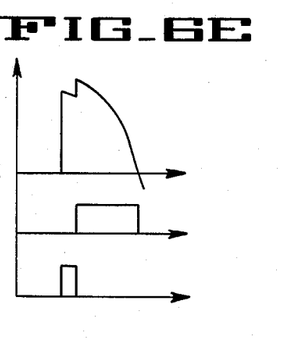
Figure 6F:
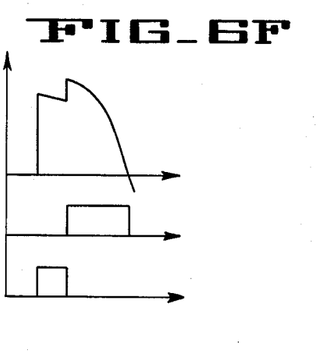

The operation of FIG. 1 has been described wherein the amount of driving power to coils L1, L2 is controlled by controlling the time that capacitors C1, C2 provide voltage to L1 and L2 as seen in FIGS. 6D–6F. Other methods of controlling driving power include:

1. Controlling AC line voltage.
2. Controlling the amount of charge on capacitors C1, C2.
3. Controlling the turn-on time of SCR2 and SCR4 to control the amount of time the line voltage is applied to the coils L1, L2.

Figure 7:
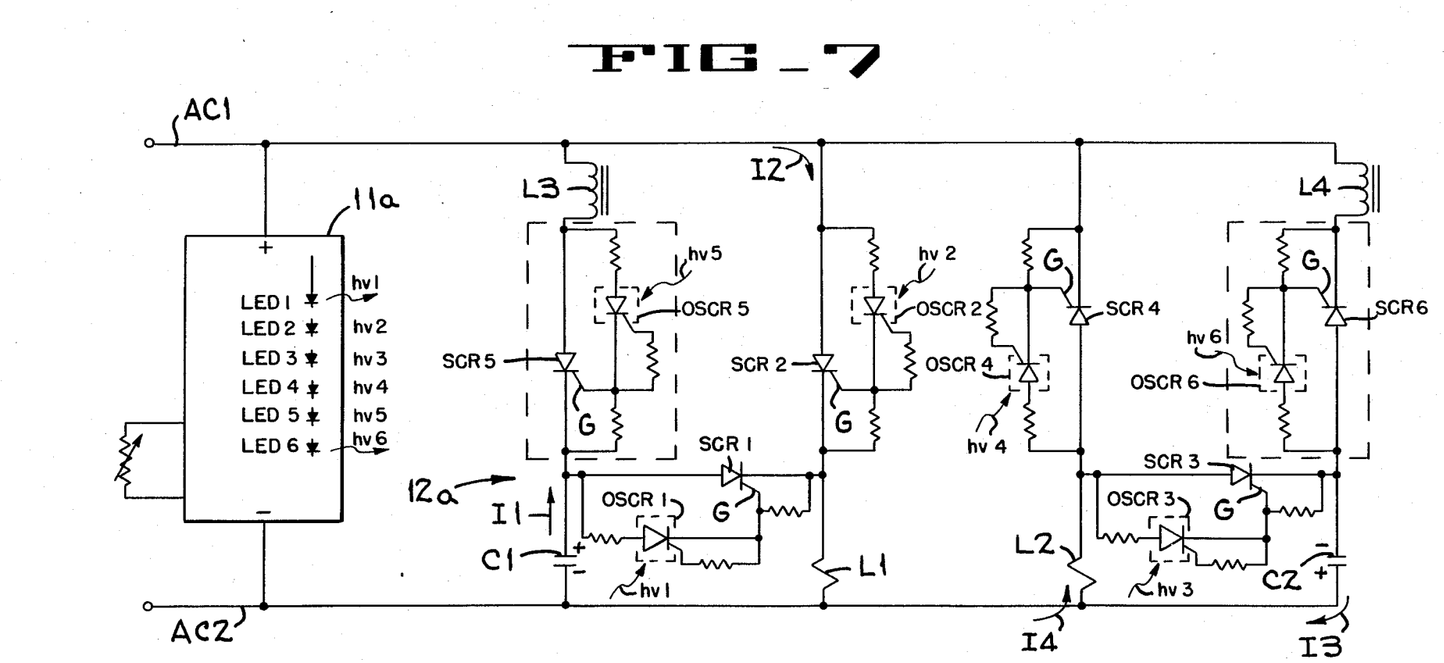
FIG. 7 is a block diagram of another embodiment of the controller of the present invention.
Figure 8:
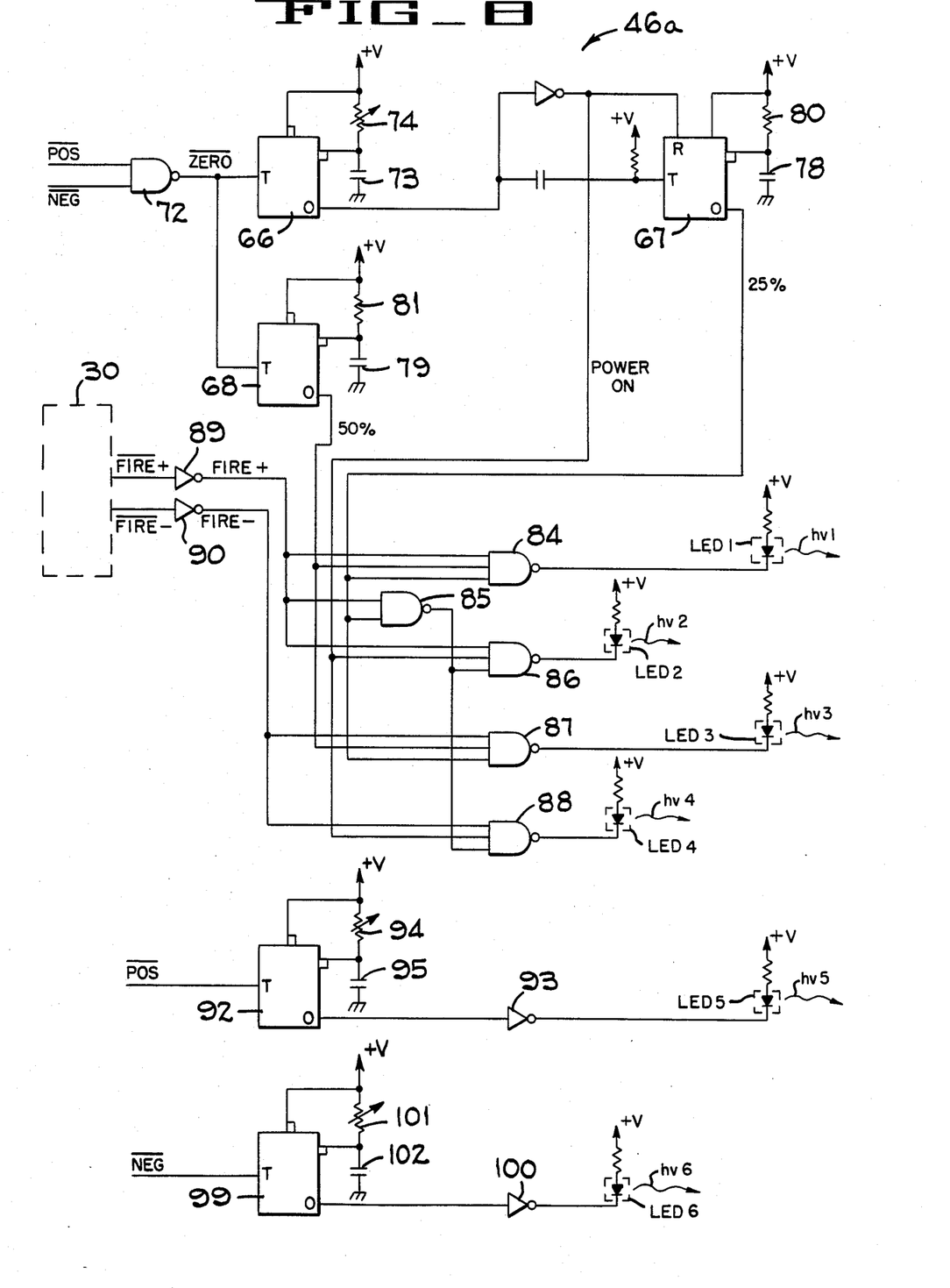
FIG. 8 is another embodiment of the digital control circuit disclosed in FIG. 4.
Figure 9:
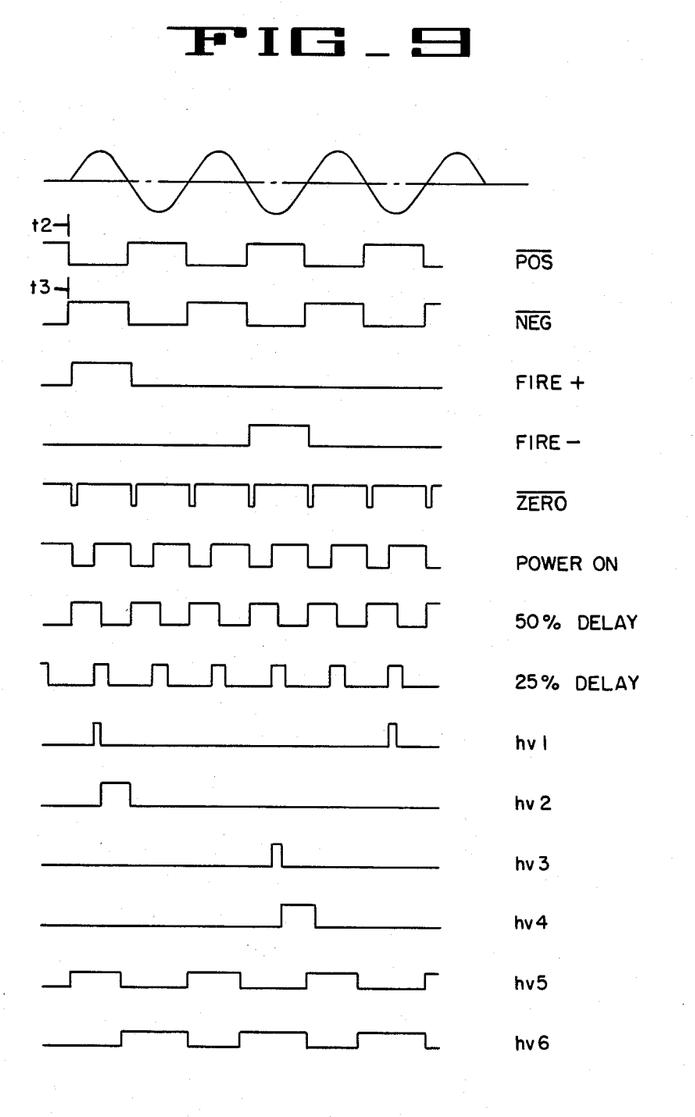
FIG. 9 discloses waveforms useful in explaining the operation of the digital control circuit of FIG. 8.

These control means can be used either alone or in combinations. The embodiment of the phase control circuit 11a and power circuit 12a disclosed in FIG. 7 includes means for controlling driving power by controlling the amount of charge on capacitors C1, C2 using an additional pair of optical coupled pairs LED5-/OSCR5, LED6/OSCR6 and a pair of silicon controlled rectifiers SCR5, SCR6. A driver circuit 46a (FIG. 8) uses the signals developed by the circuit of FIG. 3 to energize the diodes LED1–LED6 which in turn, energize the rectifiers OSCR1–OSCR6 and SCR1–SCR6 (FIG. 7) in the correct sequence and in a controlled timing relationship. A plurality of one-shot multivibrators 66–68 and their associated RC timing circuits provide the Power On, fifty percent Delay and twenty-five percent Delay signals disclosed in FIG. 9, and these signals are combined with other signals shown in FIG. 9 to render the diodes LED1–LED4 conductive in the proper phase and desired time duration. The $\overline{POS}$ and e,ovs/NEG/ signals are used by a NAND-gate 72 to provide $\overline{ZERO}$ trigger pulses to one-shot 66 which develops Power On pulses having a timed duration determined by a capacitor 73 and a variable resistor 74. The widths of the fifty percent Delay and the twenty-five percent Delay pulses are determined by a pair of capacitors 78, 79 and a pair of fixed resistors 80, 81.

The Power On, 50 percent Delay, twenty-five percent Delay and FIRE+ signals are combined by a NAND-gate 84 to render diode LED1 conductive and apply the voltage of capacitor C1 (FIG. 7) to coil L1 as previously described. A plurality of NAND-gates 85-88 similarly combine timing signals to render diodes LED2-LED4 conductive and develop the signals hv2-hv4 in the phases disclosed in FIG. 9. A pair of inverters 89, 90 provide the correct signal polarity of FIRE+ and FIRE− signals to develop the hv1-hv4 signals.

A series of radiation pulses hv5 corresponding to the positive halves of the AC1 voltage (FIGS. 1, 9) are developed by applying the $\overline{POS}$ signal to the trigger input of a one-shot multivibrator 92. The output pulses of the multivibrator are inverted by an inverter 93 which drives LED5. The width of the pulses from the multivibrator 92 and the duration of pulses hv5 are controlled by a variable resistor 94 and a capacitor 95. Pulses hv5 cause the OSCR5 and SCR5 to be conductive so that the capacitor C1 (FIG. 2) is recharged to the polarity shown.

A series of radiation pulses hv6 corresponding to the negative halves of the AC1 voltage (FIGS. 1, 9) are developed by applying the $\overline{NEG}$ signal to the trigger input of a one-shot multivibrator 99. Output pulses from the multivibrator 99 are inverted by an inverter 100 which drives the LED6. The width of the pulses from multivibrator 99 and the duration of pulses hv6 are controlled by a variable resistor 101 and a capacitor 102. Pulses hv6 cause the OSCR6 and SCR6 to be rendered conductive and charge the capacitor C2 (FIG. 7) to the polarity shown.

When the time duration of the discharge of capacitor C1 through magnet coil L1 (FIG. 7) is reduced to zero, the amount of driving current to coil L1 is determined by the duration of time line AC1 provides current on the positive half cycles. FIGS. 6A-6C disclosed the waveform of gate voltage for the trigger SCR's and the coil voltage for different time durations using control of line voltage to the coils.

Figure 6G:
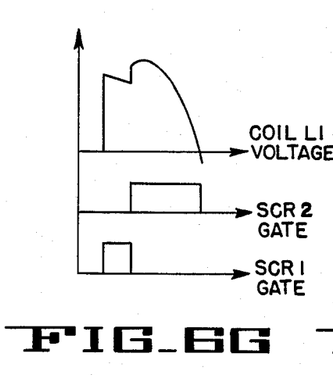
Figure 6H:
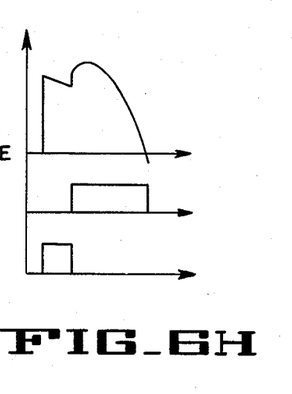
Figure 6I:
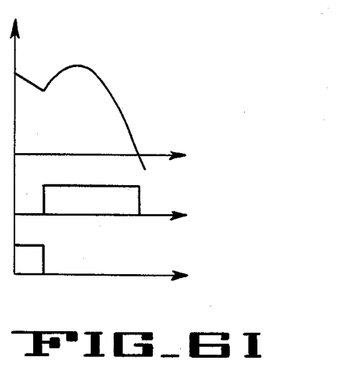

FIGS. 6D-6F illustrate the change in coil voltage waveforms as the discharge time of capacitors C1, C2 (FIG. 7) changes. FIGS. 6G, 6H, 6J illustrate the change in coil voltage waveforms when the discharge time of the capacitors C1, C2 remains constant and the duration of time the line voltage is applied to the coils changes.

It will be seen from the foregoing description that the present invention provides a controller which derives both power and timing from a single AC line and which drives two magnet coils at a frequency exactly one-third of the power line frequency. Each magnet coil is energized only once for mechanical cycle, which is also one-third of the power line frequency, the magnet coils being turned off 180° apart in the mechanical cycle as a natural consequent of the frequency division method. The one-third frequency division is uniquely advantageous because the direct current component in the AC line is canceled and peak currents are minimized. This frequency division arrangement allows delays to be inserted in the timing circuit in order to achieve a wide range in control of the power level to the magnet coils. Only one adjustable resistor is needed to control the delay in both the positive and negative portions of each cycle so no imbalance appears on the power line due to unequal delays. A capacitor provides initial voltage across each of the magnet coils and reduces the peak values of currents supplied by the power line. Optical coupling between the power line and the trigger circuitry prevents feedback of electrical noise into the trigger circuitry and insures reliable triggering to the magnetic coils.

Although the best mode contemplated for carrying out the present invention has been herein shown and described, it will be apparent that modification and variation may be made without departing from what is regarded to be the subject matter of the invention.

What is claimed is:

1. A controller for operating an electromagnetic exciter at a subharmonic of an electrical power line frequency using a single phase alternating current source for both operating power and for synchronizing said controller with said subharmonic, said controller comprising:
   first and second electromagnetic coils;
   first and second electrical capacitors;
   means for connecting said capacitors to said current source to provide an electrical charge on said capacitors;
   means for connecting said first capacitor to said first coil to provide an electrical current through said first coil during a portion of a positive half cycle at said subharmonic frequency;
   means for connecting said current source to said first coil to provide additional electrical current through said first coil during said positive half cycle;
   means for connecting said second capacitor to said second coil to provide an electrical current through said second coil during a portion of a negative half cycle at said subharmonic frequency; and
   means for connecting said current source to said second coil to provide additional electrical current through said second coil during said negative half cycle.

2. A controller as defined in claim 1 wherein said subharmonic is exactly one-third the power line frequency.

3. A controller as defined in claim 1 including means for synchronizing current through said first coil with a positive half cycle of said current source and means for synchronizing current through said second coil with a negative half cycle of said current source.

4. A controller as defined in claim 3 including means for synchronizing current from said first capacitor with current from said current source to said first coil, and means for synchronizing current from said second capacitor with current from said current source to said second coil.

5. A controller as defined in claim 1 including means for controlling the amount of current to said first and said second electromagnetic coils to control the driving power to said first and said second coils.

6. A controller as defined in claim 5 wherein said control means causes substantially equal amounts of current to be delivered to said first and said second coils at all current levels.

7. A controller as defined in claim 5 wherein said control means include a single variable means for controlling current to both said first and said second coils.

8. A controller as defined in claim 1 wherein said current to said first coil is 180 degree out of phase with said current to said second coil at said subharmonic frequency.

9. A controller as defined in claim 8 wherein each of said first and said second coils is energized for substantially the same time duration.

* * * * *